United States Patent
Guo et al.

(10) Patent No.: US 11,182,652 B2
(45) Date of Patent: Nov. 23, 2021

(54) METHODS AND SYSTEM FOR INFERRING PERCEPTION BASED ON AUGMENTED FEATURE MAPS OF A PERCEPTION NETWORK

(71) Applicant: Toyota Motor Engineering & Manufacturing North America, Inc., Plano, TX (US)

(72) Inventors: Rui Guo, San Jose, CA (US); Hongsheng Lu, San Jose, CA (US); Prashant Tiwari, Santa Clara, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 116 days.

(21) Appl. No.: 16/542,715

(22) Filed: Aug. 16, 2019

(65) Prior Publication Data
US 2021/0049404 A1 Feb. 18, 2021

(51) Int. Cl.
| | |
|---|---|
| *G06K 9/62* | (2006.01) |
| *G06N 3/08* | (2006.01) |
| *H04W 4/46* | (2018.01) |
| *G06N 3/04* | (2006.01) |
| *G06K 9/00* | (2006.01) |

(52) U.S. Cl.
CPC ......... *G06K 9/629* (2013.01); *G06K 9/00791* (2013.01); *G06K 9/6232* (2013.01); *G06K 9/6262* (2013.01); *G06N 3/04* (2013.01); *G06N 3/08* (2013.01); *H04W 4/46* (2018.02)

(58) Field of Classification Search
CPC .... G06K 9/629; G06K 9/6262; G06K 9/6232; G06K 9/00791; H04W 4/46; G06N 3/08; G06N 3/04
See application file for complete search history.

(56) References Cited

U.S. PATENT DOCUMENTS

| | | | |
|---|---|---|---|
| 9,866,782 B2 | 1/2018 | Shahraray et al. | |
| 10,109,198 B2 | 10/2018 | Qiu et al. | |
| 10,311,335 B1 * | 6/2019 | Kim | G06K 9/00664 |

(Continued)

FOREIGN PATENT DOCUMENTS

| | | |
|---|---|---|
| CN | 109376594 A | 2/2019 |
| WO | 2005052883 A1 | 6/2005 |

OTHER PUBLICATIONS

Fawzi et al. "Multi-vehicle Cooperative perception and Augmented reality for driver assistance: A possibility to 'see' through front vehicle" (Year: 2011).*

(Continued)

*Primary Examiner* — Dhaval V Patel
(74) *Attorney, Agent, or Firm* — Dinsmore & Shohl LLP

(57) ABSTRACT

An embodiment of the present disclosure takes the form of a method carried out by a perception-network device. The perception-network device provides a first perspective view of a scene to a first branch of a neural network, and generates a feature map via the first branch based on the first perspective view. The perception-network device augments the generated feature map with features of a complementary feature map generated by a second branch of the neural network provided with a second perspective view of the scene. The perception-network device generates a perception inference via the neural network based on the augmented feature map.

20 Claims, 12 Drawing Sheets

(56) References Cited

U.S. PATENT DOCUMENTS

| | | | |
|---|---|---|---|
| 2017/0024500 A1 | 1/2017 | Sebastian et al. | |
| 2017/0221176 A1* | 8/2017 | Munteanu | G06T 1/60 |
| 2017/0287338 A1 | 10/2017 | Neubecker et al. | |
| 2017/0307743 A1 | 10/2017 | Izzat et al. | |
| 2019/0295282 A1* | 9/2019 | Smolyanskiy | G01S 13/867 |
| 2020/0151465 A1* | 5/2020 | Levi | G06N 3/08 |
| 2020/0265220 A1* | 8/2020 | Zhang | G06K 9/6267 |

OTHER PUBLICATIONS

Peng, Kuan-Chuan et al., "Cross-layer features in convolutional neural networks for generic classification tasks", 2015 IEEE International Conference on Image Processing (ICIP), Sep. 2015, p. 3057-3061.

Hecht-Nielsen, Robert, "Theory of the backpropagation neural network", Neural Networks for Perception, Academic Press, 1992, p. 65-93.

Li, Hao et al., "Multi-vehicle cooperative perception and augmented reality for driver assistance: A possibility to 'see' through front vehicle", IEEE Conference on Intelligent Transportation Systems, Oct. 2011.

\* cited by examiner

US 11,182,652 B2

METHODS AND SYSTEM FOR INFERRING PERCEPTION BASED ON AUGMENTED FEATURE MAPS OF A PERCEPTION NETWORK

TECHNICAL FIELD

The present disclosure generally relates to perception-network devices and methods carried out by perception-network devices, and more specifically to systems and methods for inferring perception of a scene based on feature maps generated by a perception neural network and augmented by a perception-network device.

BACKGROUND

Autonomous and semi-autonomous vehicles, as well as other vehicles, may perform one or more tasks based on data obtained via a sensor of the vehicle. For example, a vehicle may perform a collision avoidance maneuver to avoid a collision with another vehicle, pedestrian, or other object based on data collected via a camera or lidar sensor of the vehicle. However, existing techniques take into account sensor data obtained from a single field of view only.

SUMMARY

An embodiment of the present disclosure takes the form of a method that includes providing a first perspective view of a scene to a first branch of a neural network, and generating a feature map via the first branch based on the first perspective view. The method further includes augmenting the generated feature map with features of a complementary feature map generated by a second branch of the neural network provided with a second perspective view of the scene. The method also includes generating a perception inference via the first branch based on the augmented feature map.

Another embodiment takes the form of a perception-network system having a first perception-network device. The first perception-network device includes a processor and a non-transitory computer-readable storage medium having first-device instructions that, when executed by the processor, cause the first perception-network device to provide a first perspective view to a first branch of a neural network executed by the first perception-network device. The instructions further cause the first perception-network device to generate a feature map via the first branch based on the first perspective view, and to augment the generated feature map with features of a complementary feature map generated by a second branch of the neural network provided with a second perspective view. The instructions further cause the first perception-network device to generate a perception inference via the first branch based on the augmented feature map.

A further embodiment takes the form of a method carried out by a perception-network system. The method includes providing, to a neural network, both a first perspective view of a scene and a second perspective view of the scene. The method further includes providing, to an augmentation module, both a first feature map generated by the neural network based on the first perspective view and a second feature map generated by the neural network based on the second perspective view. The augmentation module is configured to output a complementary feature map including either a map provided to the augmentation module or an empty feature map. The method further includes obtaining a first perception inference generated by neural network based on the first feature map, a first complementary feature map output by the augmentation module, and a parameter of the neural network. The first complementary feature map includes the second feature map provided to the augmentation module. The method further includes obtaining a second perception inference generated by the neural network based on the second feature map, a second augmented map output by the augmentation module, and the parameter of the neural network. The second complementary feature map includes the first feature map provided to the augmentation module. The method further includes updating the parameter of the neural network based on a sum of a first cost and a second cost. The first cost is based on the first perception inference and the second cost is based on the second perception inference These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Perception-network systems, perception-network devices, and methods for generating a perception inference are disclosed herein. In some embodiments, a perception-network device provides a first perspective view of a scene to a first branch of a neural network, and generates a feature map via the first branch based on the first perspective view. The perception-network device augments the generated feature map with features of a complementary feature map generated by a second branch of the neural network provided with a second perspective view of the scene. The perception-network device generates a perception inference via the first branch based on the augmented feature map. Based on the augmentation, a vehicle or other perception-network device may be able to correct, enhance, or expand its own perception to understand relative locations of objects in a scene with respect to the vehicle, as well as the relative locations of objects in the scene with respect to each other. Multiple perspective views of a given scene can be taken into account—for example, if the perspective views of the scene overlap. Moreover, the augmentation may involve sharing bandwidth-efficient data for generating the inference, instead of (or in addition to) sharing the generated inference itself. Various embodiments of perception-network systems, perception-network devices, and methods for generating a perception inference will now be described in detail with reference to the drawings.

Figure 1:
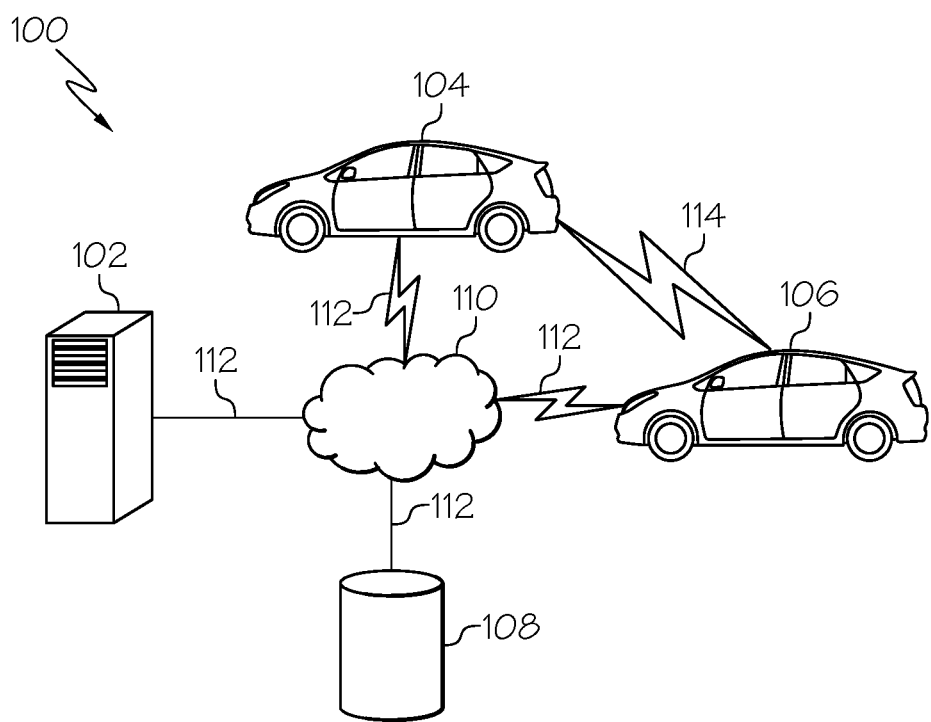
FIG. 1 depicts a perception-network system, according to one or more embodiments described and illustrated herein.

FIG. 1 depicts a perception-network system, according to one or more embodiments described and illustrated herein. As shown, a system 100 includes a training device 102, a vehicle 104, a vehicle 106, a database 108, and a network 110. Training device 102 and database 108 are communicatively connected to network 110 via respective communication links 112. Additionally, vehicle 104 and vehicle 106 are communicatively connected to network 110 via respective communication links 112, and are communicatively connected to each other via a wireless communication link 114.

Training device 102 could take the form of any device capable of carrying out the training-device functions described herein. As such, training device 102 could take the form of a server computer, a mainframe, a virtual machine, a workstation, a terminal, a personal computer, or any combination of these or other training devices. Vehicles 104 and 106 could take the form of respective autonomous vehicles, semi-autonomous vehicle, manually-operated vehicles (for example, in the form of respective automobiles, as shown in FIG. 1), or any other vehicles capable of carrying out the vehicle functions described herein. among other possibilities. Database 108 could take the form of a database management system (DBMS) such as a relational or non-relational DBMS, a server computing device, a cloud-computing device, or any combination of these or other databases, and may be configured to store one or more perspective views, as examples. Additional details regarding training device 102, vehicles 104 and 106, and database 108 are provided below.

Network 110 may include one or more computing systems and at least one network infrastructure configured to facilitate transferring data between one or more entities communicatively connected to network 110. The network may include one or more wide-area networks (WANs) and/or local-area networks (LANs), which may be wired and/or wireless networks. In some examples, the network may include the Internet and/or one or more wireless cellular networks, among other possibilities. The network may operate according to one or more communication protocols such as Ethernet, Wi-Fi, internet protocol (IP), transmission control protocol (TCP), long-term evolution (LTE), and the like. Although the network is shown as a single network, it should be understood that the network may include multiple, distinct networks that are themselves communicatively linked. The network could take other forms as well.

Communication links 112 may communicatively link respective entities with network 110 to facilitate communication between entities communicatively connected to the network, and could take the form of one or more wired and/or wireless communication links. Any of communication links 112 may be a combination of hardware and/or software, perhaps operating on one or more communication-link layers such as one or more physical, network, transport, and/or application layers. Wireless communication link 114 may take a form similar to communication links 112 that facilitate wireless communication between entities such as vehicles 104 and 106.

It should be understood that system 100 may include different and/or additional entities. For example, database 108 and/or network 110 may not be present in some embodiments, and training device 102 may not be connected to network 110 in some embodiments. As another example, communication links 112 between network 110 and vehicles 104 and 106 may not be present in some embodiments. Other variations are possible as well.

Figure 2A:
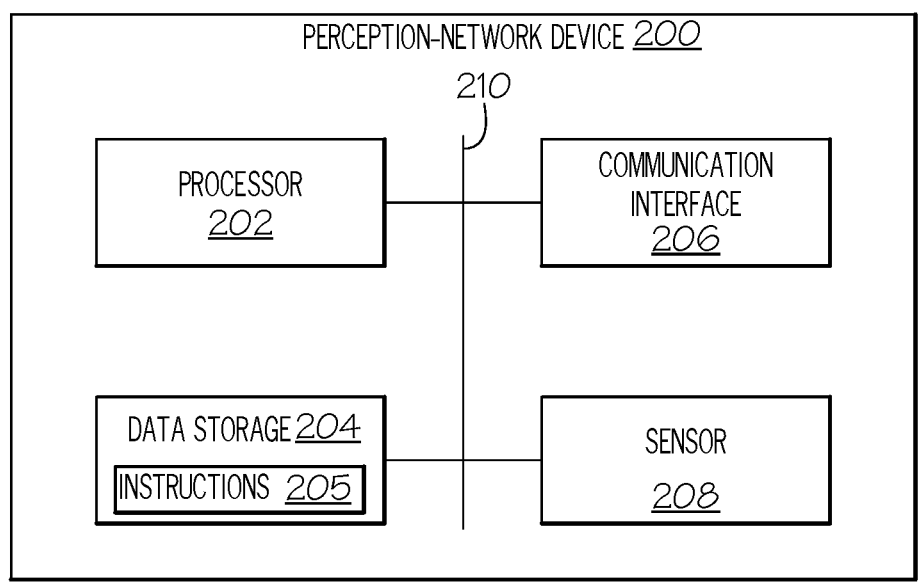
FIG. 2a depicts a block diagram of a perception-network device, according to one or more embodiments described and illustrated herein.

FIG. 2a depicts a block diagram of a perception-network device, according to one or more embodiments described and illustrated herein. As shown, perception-network device 200 includes a processor 202, a data storage 204, a communication interface 206, and a sensor 208, each of which are communicatively connected by a system bus 210. Training device 102, vehicle 104, and vehicle 106 are examples of a perception-network device.

Processor 202 may take the form of one or more general-purpose processors and/or one or more special-purpose processors, and may be integrated in whole or in part with data storage 204, communication interface 206, sensor 208, and/or any other component of perception-network device 200, as examples. Accordingly, processor 202 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 204 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database management system (RDBMS), any other non-volatile storage, or any combination of these, to name just a few examples.

Instructions 205 may be stored in data storage 204, and may include machine-language instructions executable by processor 202 to cause perception-network device 200 to perform the perception-network-device functions described herein. Additionally or alternatively, instructions 205 may include script instructions executable by a script interpreter configured to cause processor 202 and perception-network device 200 to execute the instructions specified in the script instructions. Those having skill in the art will recognize that instructions 205 may take other forms as well.

Additional data may be stored in data storage 204, such as one or more perspective views of respective scenes, as will be described in further detail below. The additional data such as the perspective views could be stored as a table, a flat file, data in a filesystem of the data storage, a heap file, a B+ tree, a hash table, a hash bucket, or any combination of these, as examples.

Communication interface 206 may be any component capable of performing the communication-interface functions described herein. As such, communication interface 206 could take the form of an Ethernet, Wi-Fi, Bluetooth, and/or USB interface, among many other examples. Communication interface 206 may receive data over network 110 via communication links 112 and/or 114, for instance.

Sensor 208 could take the form of one or more sensors operable to capture perspective views, to collect other information for use by perception-network device 200, and to perform any other of the sensor functions described herein. The sensor could be positioned or mounted on perception-network device 200. For example, perception-network device 200 could take the form of vehicle 104 and/or 106, and sensor 208 could be mounted on an exterior of the vehicle. Though sensor 208 may be referenced in the singular throughout this disclosure, those of skill in the art will appreciate that sensor 208 may take the form of (or include) a single sensor or multiple sensors.

Sensor 208 may obtain signals (such as electromagnetic radiation) that can be used by perception-network device 200 to obtain a view of a scene from a perspective of the sensor. For example, sensor 208 could take the form of (or include) a radar sensor, a lidar sensor, and/or a camera. The radar sensor and/or the lidar sensor may send a signal (such as pulsed laser light or radio waves) and may obtain a distance measurement from the sensor to the surface of an object based on a time of flight of the signal—that is, the time between when the signal is sent and when the reflected signal (reflected by the object surface) is received by the sensor. The camera may collect light or other electromagnetic radiation and may generate an image representing a perspective view of a scene based on the collected radiation.

System bus 210 may be any component capable of performing the system-bus functions described herein. In an embodiment, system bus 210 is any component configured to transfer data between processor 202, data storage 204, communication interface 206, sensor 208, and/or any other component of perception-network device 200. In an embodiment, system bus 210 includes a traditional bus as is known in the art. In other embodiments, system bus 210 includes a serial RS-232 communication link, a USB communication link, and/or an Ethernet communication link, alone or in combination with a traditional computer bus, among numerous other possibilities. In some examples, system bus 210 may be formed from any medium that is capable of transmitting a signal, such as conductive wires, conductive traces, or optical waveguides, among other possibilities. Moreover, system bus 210 may be formed from a combination of mediums capable of transmitting signals. The system bus could take the form of (or include) a vehicle bus, such as a local interconnect network (LIN) bus, a controller area network (CAN) bus, a vehicle area network (VAN) bus, or any combination of these or mediums. Those of skill in the art will recognize that system bus 210 may take various other forms as well.

Figure 2B:
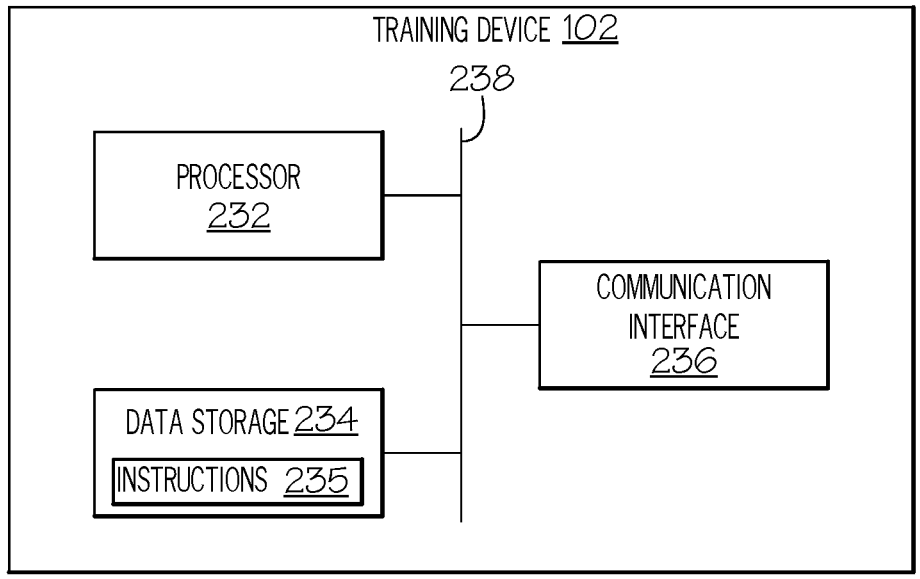
FIG. 2b depicts a block diagram of a training device, according to one or more embodiments described and illustrated herein.

FIG. 2b depicts a block diagram of a training device, according to one or more embodiments described and illustrated herein. As shown, a perception-network device takes the form of training device 102 that includes a processor 232, a data storage 234 storing instructions 235, and a communication interface 236, each of which are communicatively connected via a system bus 238. Instructions 235, when executed by processor 232, cause training device 102 to perform the training-device functions described herein. Processor 232, data storage 234, instructions 235, communication interface 236, and system bus 238 may take a form similar to processor 202, data storage 204, instructions 205, communication interface 206, and system bus 210 described above with reference to FIG. 2a.

Figure 2C:
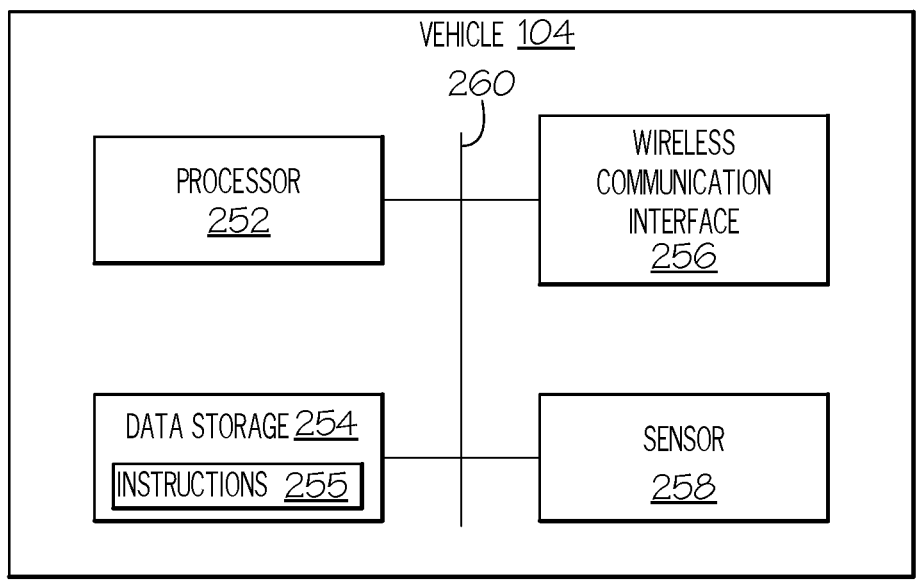
FIG. 2c depicts a block diagram of a vehicle, according to one or more embodiments described and illustrated herein.

FIG. 2c depicts a block diagram of a vehicle, according to one or more embodiments described and illustrated herein. As shown, a perception-network device takes the form of vehicle 104 that includes a processor 252, a data storage 254 storing instructions 255, a wireless communication interface 256, and a sensor 258, each of which are communicatively connected via a system bus 260. Instructions 255, when executed by processor 252, cause vehicle 104 to perform the vehicle functions described herein. Processor 252, data storage 254, instructions 255, wireless communication interface 256, sensor 258, and system bus 260 may take a form similar to processor 202, data storage 204, instructions 205, communication interface 206, sensor 208, and system bus 210 described above with reference to FIG. 2a. Wireless communication interface 256 may facilitate wireless communication, or any combination of wired, wireless, and other communication.

Vehicle 106 may take a form similar to vehicle 104, and could include a respective processor, a data storage containing instructions executable by the processor, a communication interface, a sensor, and a system bus, as examples. It should be understood that training device 102, vehicle 104, and vehicle 106 may include different and/or additional components, and some or all of the functions of a given component could instead be carried out by one or more different components.

Figure 3:
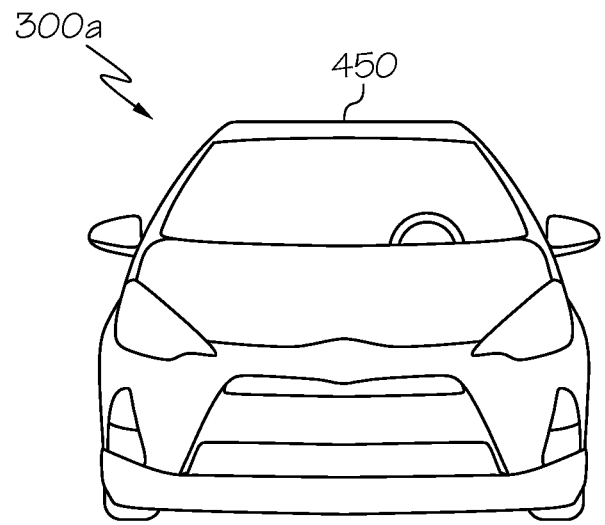
FIG. 3 depicts representations of a scene from different points of view, according to one or more embodiments described and illustrated herein.
Figure 3:
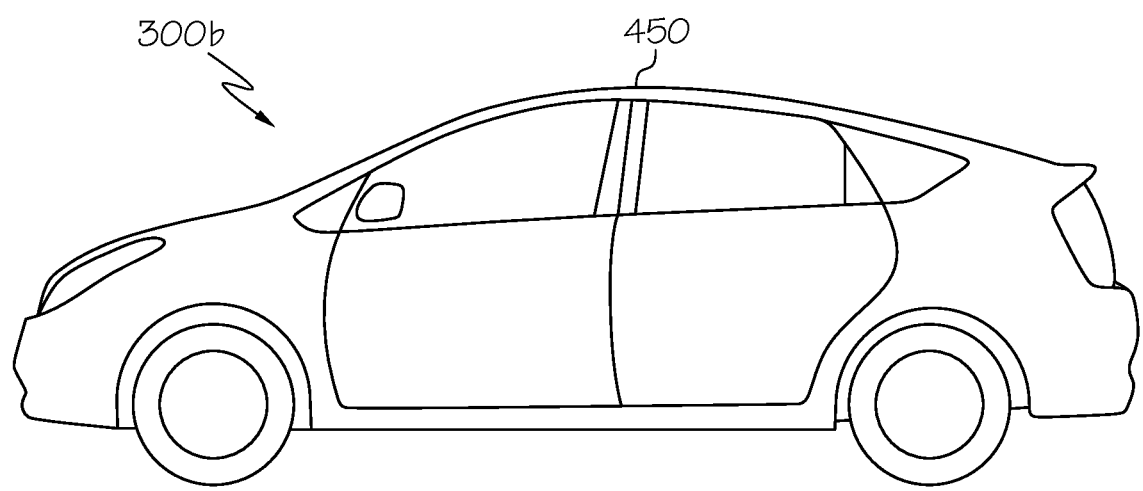

FIG. 3 depicts representations of a scene from different points of view, according to one or more embodiments described and illustrated herein. As shown, perspective views 300a and 300b represent a given scene that includes vehicle 450. A perspective view may take the form, for example, of a digital representation of a scene from a given perspective, angle, or field of view, among other possibilities. Perspective view 300a represents the scene from a point of view that includes the front of vehicle 450, and perspective view 300b represents the same scene from a different point of view that includes the side of the same vehicle. A given scene could include different and/or additional objects, such as one or more pedestrians, road agents (such as vehicles), or any combination of these or other objects.

A perspective view could take the form of a visual image such as a digital representation of a photograph or a video. However, a perspective view need not be limited to a visual image, and could include other perspective views such as lidar or radar data, as examples. A perspective view could take the form of a two-dimensional perspective view, a three-dimensional perspective view, or a mapping (e.g., a three-dimensional projection) of a three-dimensional perspective view to a two-dimensional perspective view, among numerous other possibilities. A perspective view could represent a single point in time (e.g., in the case of an image) or a span of time (e.g., in the case of a video).

In an embodiment, the perspective view takes the form of a two-dimensional image and is represented by a matrix. For example, the image could be an image two thousand pixels high and three thousand pixels wide, and the matrix representation could be a matrix that includes two thousand rows and three thousand columns corresponding to the respective rows and columns of pixels in the image. The values of the matrix at a respective position may correspond to the pixel value of the image at the same position. For example, a pixel at position 200,300 of the image may be represented by a value at position 200,300 of the matrix. The value at a given position of the matrix may correspond to, for example, a red/green/blue (RGB) value of a pixel of the image at that same position.

Figure 4:
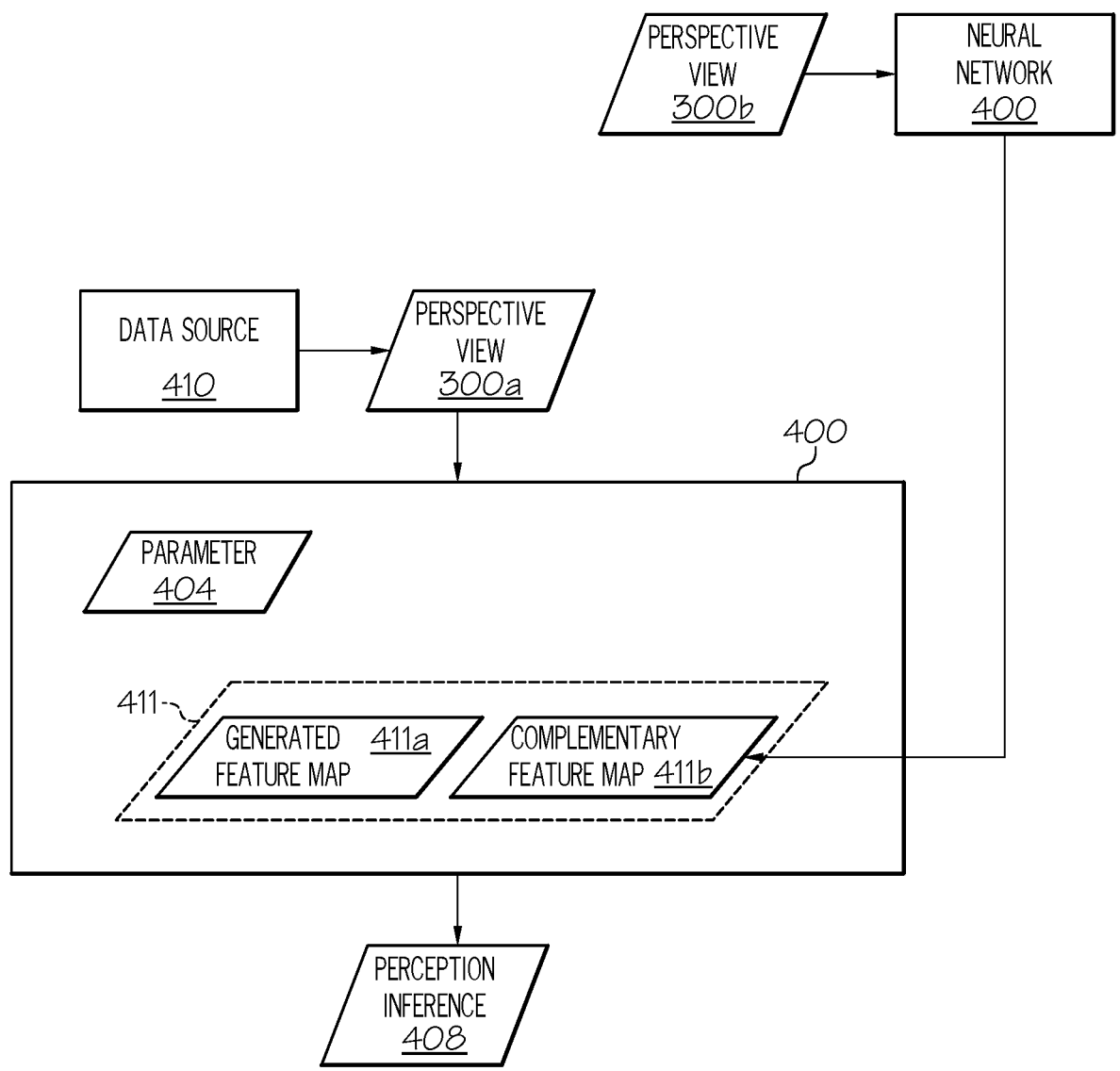
FIG. 4 depicts an operation of a perception neural network, according to one or more embodiments described and illustrated herein.

FIG. 4 depicts an operation of a perception neural network, according to one or more embodiments described and illustrated herein. As shown, perception-network device 200 provides perspective view 300a to a perception neural network 400. The perception-network device generates feature map 411a via the neural network, and augments the generated feature map with features of complementary feature map 411b generated by neural network 400 provided with perspective view 300b. Based on augmented feature map 411 that includes the generated feature map augmented with features of the complementary feature map, the neural network generates perception inference 408.

Neural network 400 could take the form of a feedforward neural network, a convolutional neural network, a recurrent neural network, a deep neural network (such as a deep convolutional neural network), or any combination of these or other artificial neural networks capable of carrying out the neural-network functions described herein. Additional details regarding the neural network, as well as augmented feature map 411, generated feature map 411a, complementary feature map 411b, and perception inference 408 are provided below.

Figure 5:
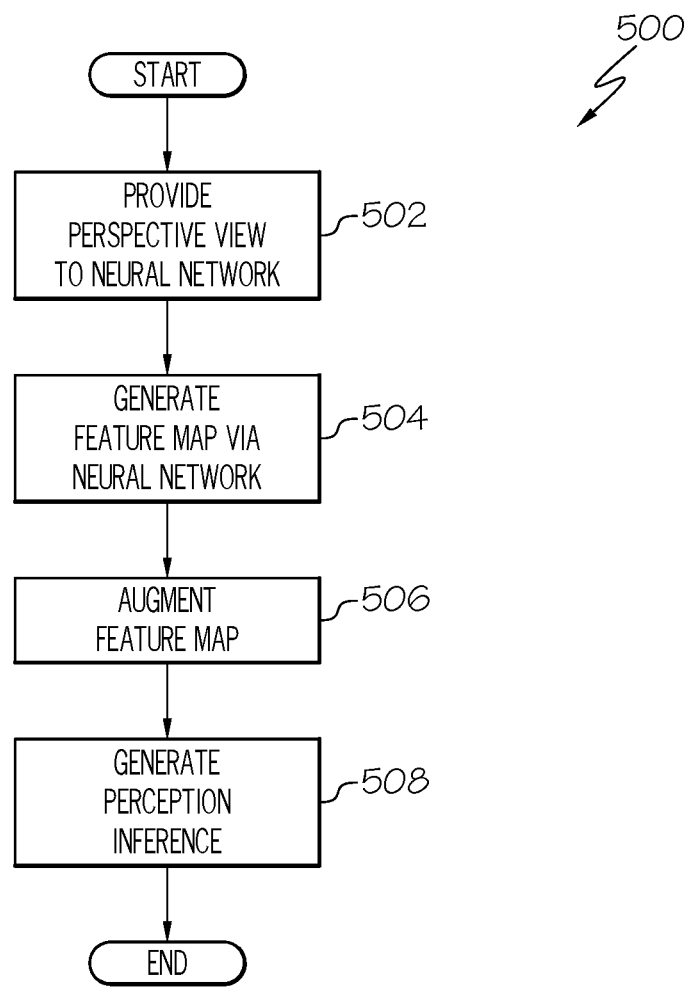
FIG. 5 depicts a flowchart of a method carried out by a perception-network device, according to one or more embodiments described and illustrated herein.

FIG. 5 depicts a flowchart of a method carried out by a perception-network device, according to one or more embodiments described and illustrated herein. As shown, a method 500 begins at step 502 with perception-network device 200 providing perspective view 300a to neural network 400. Providing perspective view 300a to neural network 400 could include perception-network device 200 obtaining the perspective view from a data source 410 and providing the obtained perspective view to the neural network. The data source could take the form of database 108, data storage 204, sensor 208, or any combination of these or other data sources. For instance, training device 102 could obtain perspective view 300a from database 108 over network 110 via communication links 112, or vehicle 104 or 106 could obtain the perspective view from sensor 258 mounted to the vehicle, among other possibilities.

At step 504, perception-network device 200 generates feature map 411a via neural network 400 based on perspective view 300a provided to the neural network at step 502. In an embodiment, perception-network device 200 generating the feature map includes neural network 400 generating the feature map based on the perspective view provided to the neural network by the perception-network device.

Generating feature map 411a may include generating the feature map via one or more layers of neural network 400, and/or generating the feature map based on one or more parameters of neural network 400 (in addition to perspective view 300a). Several examples are described with reference to FIG. 6a.

Figure 6A:
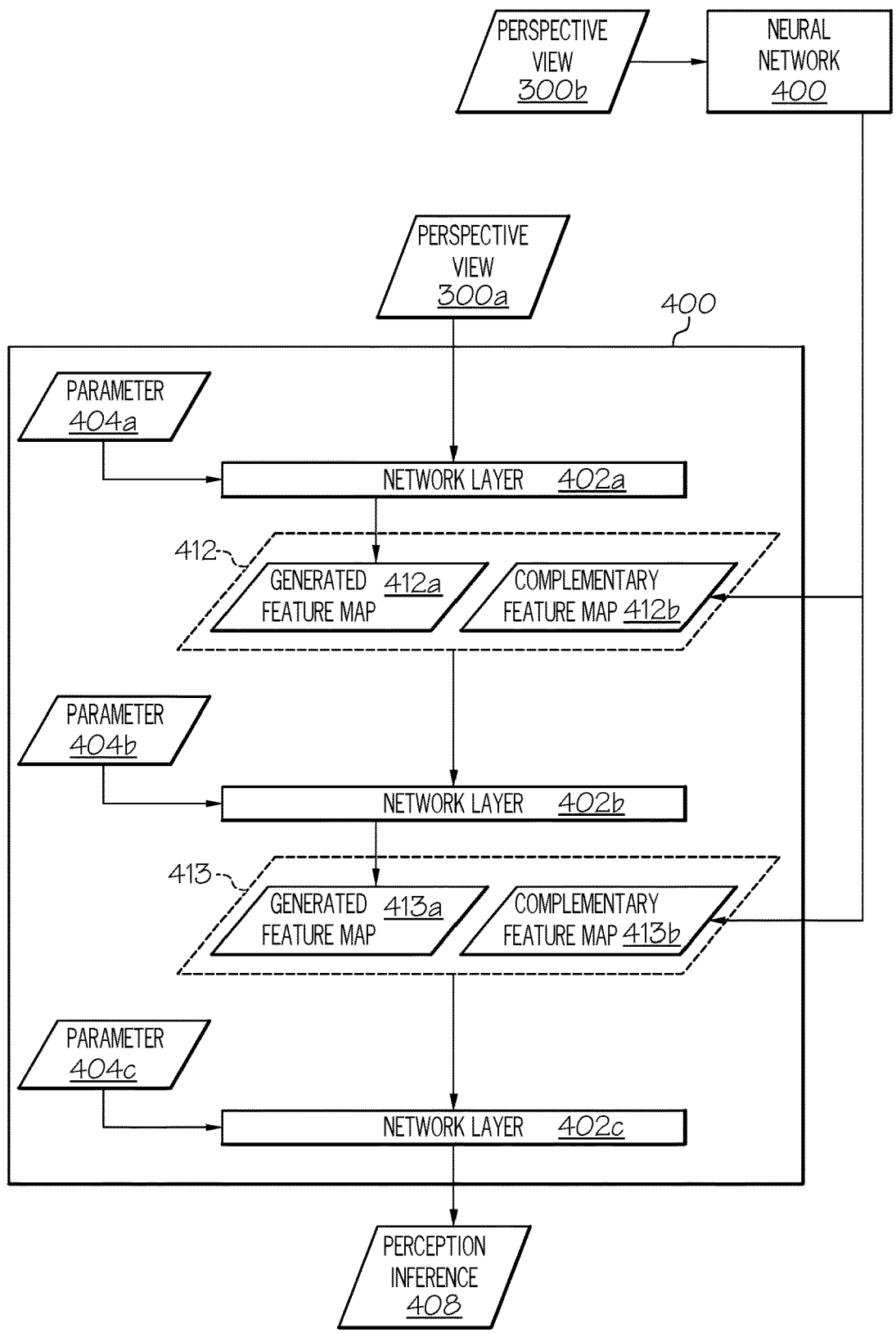
FIG. 6a depicts an operation of a perception neural network having multiple layers and parameters, according to one or more embodiments described and illustrated herein.

FIG. 6a depicts an operation of a perception neural network having multiple layers and parameters, according to one or more embodiments described and illustrated herein. In the illustrated embodiment, neural network 400 includes network layers 402a, 402b, and 402c, and parameters 404a, 404b, and 404c. Parameter 404a is a parameter of layer 402a, parameter 404b is a parameter of layer 402b, and parameter 404c is a parameter of layer 401c. It should be understood that neural network 400 may include additional and/or fewer layers, and additional and/or fewer parameters. In the illustrated embodiment, providing perspective view 300a to neural network 400 involves providing the perspective view to a layer of the neural network, such as layer 402a.

As shown in FIG. 6a, generating the feature map may include generating feature map 412a via layer 402a, and/or generating feature map 413a via layer 402b. Additionally, generating feature map 412a may include generating the feature map based on parameter 404a (and perspective view 300a), and generating feature map 413a may include generating the feature map based on parameter 404b (and the perspective view). Moreover, generating feature map 412a may include generating feature map 412a via layer 402a based on parameter 404a and perspective view 300a, and generating feature map 413a may include generating the feature map via layer 402b based on parameter 404b and the perspective view. In an embodiment, neural network 400 generating a feature map via a layer includes the layer generating the feature map. It should be understood that neural network 400 may include additional and/or fewer layers, and that additional and/or fewer feature maps may be generated.

As shown in FIG. 6a, generating the feature map based on perspective view 300a may include generating the feature map based on another feature map generated based on perspective view 300a. For example, as shown in FIG. 6a, generating feature map 413a includes generating the feature map based on augmented feature map 412—that is, based on feature map 412a augmented with features of complementary feature map 412b. Feature map 412a in turn is generated based on perspective view 300a.

Generating a feature map based on perspective view 300a may include applying a filter to the perspective view. The filter could take the form of a kernel, a convolutional matrix, a matrix transformation, or any other filter, as examples, and the generated feature map could take the form of an output of the filter, which could include one or more values, vectors, or matrices, among other possibilities. Generating the feature map based on perspective view 300a and a parameter may include applying the filter to the perspective view based on the parameter. In the embodiment shown in FIG. 6a, a given layer generating a feature map may involve the layer applying a filter different from the filters possibly applied by other layers, and/or may involve the layer applying a given filter based on parameters different from parameters used by other layers to generate feature maps.

At step 506, perception-network device 200 augments feature map 411a generated at step 504 with complementary feature map 411b generated by neural network 400 provided with perspective view 300b.

Augmenting the feature map generated by neural network 400 may include augmenting multiple feature maps generated by the neural network. For example, as shown in FIG. 6a, augmenting the generated feature map may include augmenting feature map 412a with complementary feature map 412b generated by neural network 400 provided with perspective view 300b, and/or may involve augmenting feature map 413a with complementary feature map 413b generated by neural network 400 provided with perspective view 300b.

A complementary feature map generated by neural network 400 may take the form of (or include) a feature map generated by the neural network via a given branch of the neural network. In other words, the complementary feature map may be generated by the given branch of the neural network. Similarly, perception-network device 200 generating a feature map via neural network 400 may involve the perception-network device generating the feature map via a different branch of the neural network. In other words, the perception-network device generating the feature map via the neural network may involve the different branch of the neural network generating the feature map.

Figure 6B:
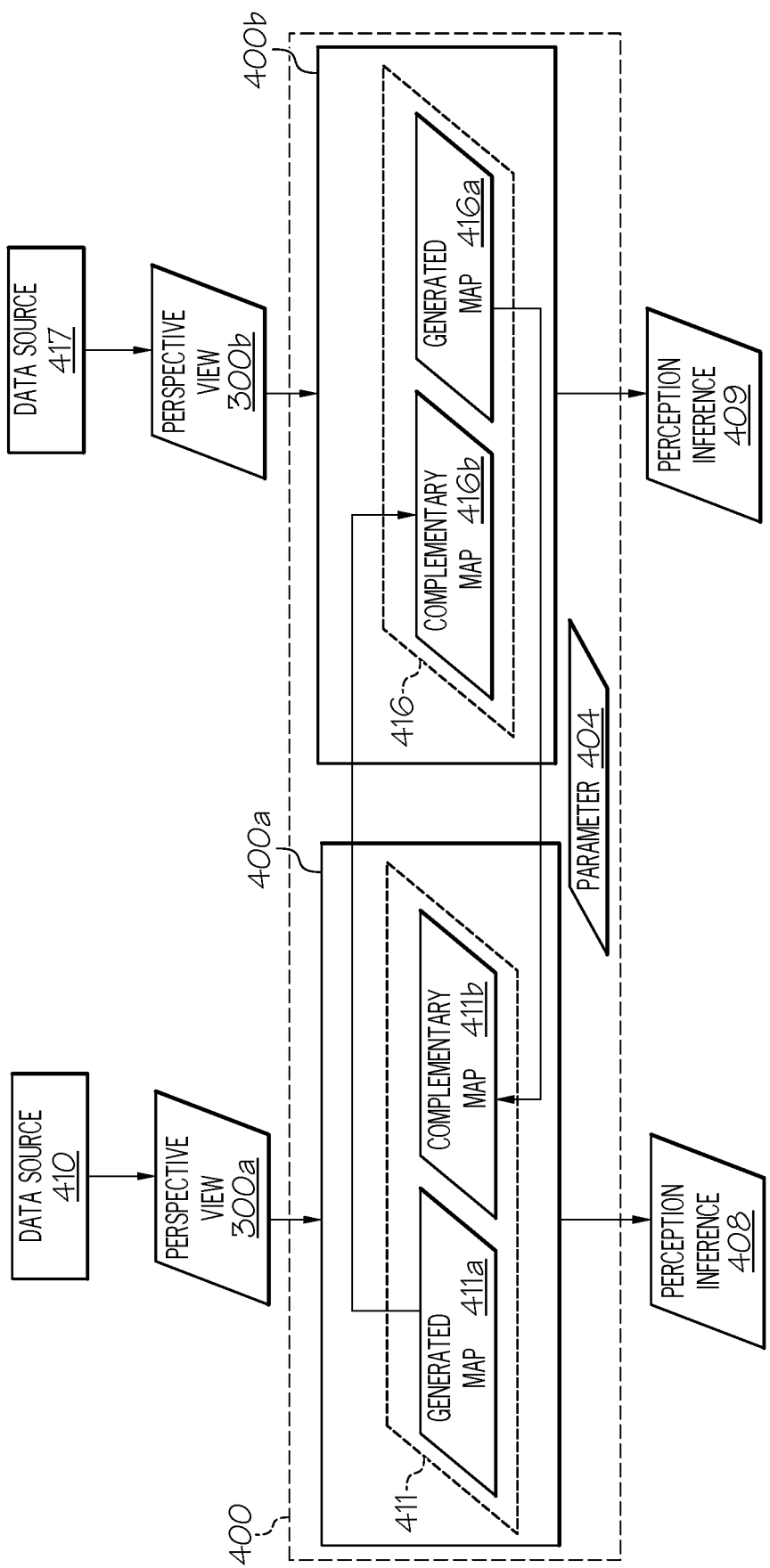
FIG. 6b depicts an operation of a perception neural network generating both a feature map and a complementary feature map, according to one or more embodiments described and illustrated herein.

FIG. 6b depicts an operation of a perception neural network generating both a feature map and a complementary feature map, according to one or more embodiments described and illustrated herein. As shown in FIG. 6b, branches 400a and 400b of neural network 400 are executed. Perception-network device 200 provides perspective view 300a to branch 400a. Likewise, perspective view 300b is provided to branch 400b—by perception-network device 200 and/or a different perception-network device such as a data source 417 (which could be the same data source as data source 410, or a different data source that takes a form similar to data source 410). Branch 400a generates feature map 411a based on perspective view 300a provided to the branch, and feature map 416a is generated by branch 400b provided with perspective view 300b. Perception-network device 200 augments generated feature map 411a with features of complementary feature map 411b, which could take the form of feature map 416a generated by branch 400b provided with perspective view 300b, or another feature map based on feature map 416a, as examples. Based on augmented feature map 411 including generated feature map 411a augmented with features of complementary feature map 411b, branch 400a generates perception inference 408.

Perception-network device 200 may execute a respective branch of neural network 400 (such as branch 400a), which may take the form of an executed instance of the neural network, for example. A given perception-network device performing a given function via neural network 400 may involve the device performing the function via neural network 400 executed by the device, which in turn may involve the device performing the function via a respective branch of the neural network executed by the device. A single perception-network device could execute multiple branches of the neural network. For instance, instructions 235 stored in data storage 234 of training device 102 may include instructions executable by processor 232 for causing the training device to execute a first branch of the neural network and a second branch of the neural network. Additionally or alternatively, respective branches could be executed by respectively different perception-network devices. For instance, instructions 255 stored in a data storage 254 of vehicle 104 may include instructions executable by a processor 252 of vehicle 104 for causing vehicle 104 to execute a first branch of the neural network, and instructions 255 stored in a data storage 254 of vehicle 106 may include instructions executable by a processor 252 of vehicle 106 for causing vehicle 106 to execute a second branch of the neural network. As a further possibility, a perception-network device may include one or more hardware modules such as one or more electronic control units (ECUs), and one or more branches of neural network 400 may be executed by the ECU, a processor such as processor 202, processor 232, and/or processor 252, or any combination of these, as examples.

Augmenting generated feature map 411a with features of complementary feature map 411b may involve perception-network device 200 obtaining the complementary feature map and augmenting the generated feature map with features of the obtained complementary feature map. Obtaining complementary feature map 411b may involve obtaining the complementary feature map from branch 400b. If branches 400a and 400b are both executed on the same perception-network device (in this example, perception-network device 200), then obtaining the complementary feature map from branch 400b may involve obtaining the complementary feature map via a shared memory of the device, via system bus 210 of the device, and/or via inter process communication (IPC), among other possibilities. If branch 400b is executed by a different perception-network device than perception-network device 200 executing branch 400a, then obtaining the complementary feature map from branch 400b may involve obtaining the feature map from the perception-network device executing branch 400b. For instance, if perception-network device 200 takes the form of vehicle 104 executing branch 400a, and branch 400b is executed by vehicle 106, then obtaining the complementary feature map may involve obtaining the complementary feature map over wireless communication link 114 via a wireless communication interface 256 of vehicle 104.

In an embodiment, branch 400a is provided with perspective view 300a but not perspective view 300b, and branch 400b is provided with perspective view 300b but not perspective view 300a. For example, branches 400a and 400b may be executed on vehicles 104 and 106 (respectively) that are communicatively connected via wireless communication link 114. The perspective views may include a large amount of data that cannot be timely exchanged between the vehicles via wireless communication link 114, perhaps because of bandwidth constraints of the wireless communication link. However, complementary feature map 411b, having been generated by a neural network provided with a given perspective view, may have a smaller data size that the perspective view itself. Because of the smaller data size, it may be possible to timely and efficiently exchange complementary feature maps between the vehicles via the wireless communication link. In such an embodiment, obtaining complementary feature map 411b from branch 400b may include obtaining data that does not include perspective view 300b (e.g., only data that does not include perspective view 300b), even if complementary feature map 411b was generated by branch 400b provided with perspective view 300b.

Figure 6C:
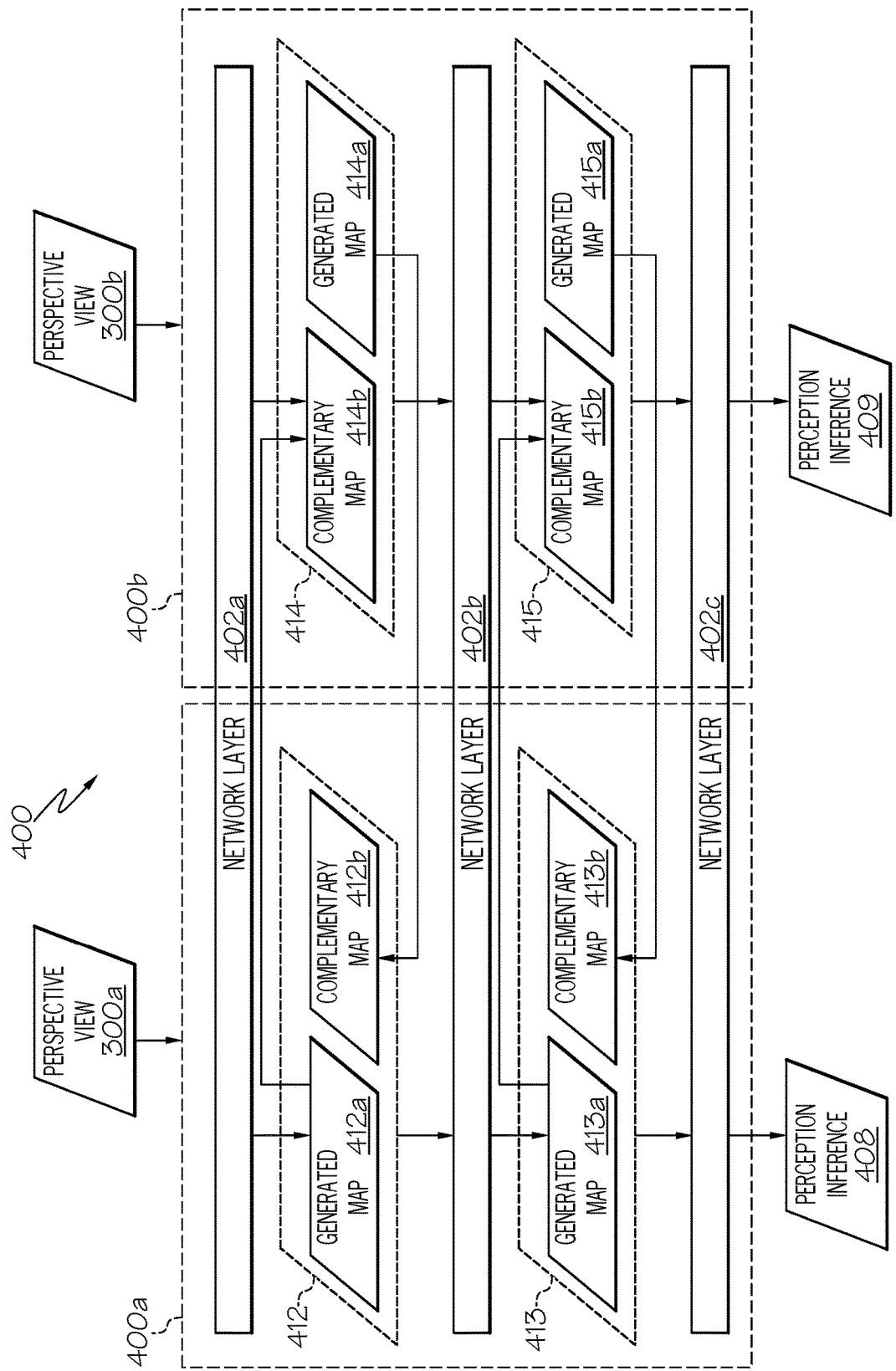
FIG. 6c depicts an operation of a perception neural network generating both a feature map and a complementary feature map via multiple layers, according to one or more embodiments described and illustrated herein.

FIG. 6c depicts an operation of a perception neural network generating both a feature map and a complementary feature map via multiple layers, according to one or more embodiments described and illustrated herein. As shown in FIG. 6c, branches 400a and 400b of neural network 400 are executed. Branch 400a performs the operations discussed above with reference to FIG. 6a. Perspective view 300b is provided to branch 400b—by perception-network device 200 and/or a different perception-network device—and feature map 414a is generated by layer 402a of branch 400b provided with perspective view 300b. Feature map 414a is augmented with features of complementary feature map 414b, which could take the form of feature map 412a generated by branch 400a or another feature map based on feature map 412a, as examples. Complementary feature map 414b could be obtained by branch 400b in a manner similar to that described above with respect to perception-network device 200 obtaining a complementary feature map.

Feature map 415a is generated by layer 402b of branch 400b based on augmented feature map 414, which includes generated feature map 414a augmented with features of complementary feature map 414b. Feature map 415a in turn is augmented with features of complementary feature map 415b, which could take the form of feature map 413a generated by branch 400a or another feature map based on feature map 413a, as examples.

In an embodiment, layer 402a of branch 400a generates feature map 412a based on perspective view 300a provided to the branch and further based on parameter 404a of the layer (not shown in FIG. 6c), and feature map 414a is generated by branch 400b based on perspective view 300b provided to branch 400b and further based on the same parameter 404a. In a further embodiment, layer 402b of branch 400a generates feature map 413a based on perspective view 300a provided to the branch and further based on parameter 404b of the layer (not shown in FIG. 6c), and feature map 415a is generated by branch 400b based on perspective view 300b provided to branch 400b and further based on the same parameter 404b. In an embodiment, both feature maps 412a and 414a are generated based on parameter 404a, or neither feature map is generated based on parameter 404a. Similarly, in an embodiment, both feature maps 413a and 415a are generated based on parameter 404b, or neither feature map is generated based on parameter 404b.

In an embodiment, the operation of network layers 402a, 402b, and 402c are identical across the branches of neural network 400. In an example, branch 400b is provided with perspective view 300a instead of perspective view 300b, and branch 400a is provided with perspective view 300b instead of perspective view 300a. Layer 402a of branch 400b generates feature map 414a based on perspective view 300a (and possibly parameter 404a), and layer 402a of branch 400a generates feature map 412a based on perspective view 300b (and possibly the same parameter 404a). In this example, feature map 414a generated by branch 400b provided with perspective view 300a is identical to feature map 412a generated by branch 400a provided with perspective view 300a. Likewise, complementary feature map 414b generated by branch 400a provided with perspective view 300b is identical to complementary feature map 412b generated by branch 400b provided with perspective view 300a.

At step 508, perception-network device 200 generates perception inference 408 via neural network 400 based on augmented feature map 411 which, as shown in FIG. 4, includes generated feature map 411a augmented with features of complementary feature map 411b. The perception inference could include relative locations of objects in a scene, relative locations of objects in the scene with respect to each other, or any combination of these or other perception inferences. In an embodiment, perception-network device 200 generating perception inference 408 via neural network 400 includes neural network 400 generating the perception inference. Generating perception inference 408 may involve generating the perception inference based on a parameter of neural network 400. For instance, as shown in FIG. 4, generating perception inference 408 may include generating the perception inference based on parameter 404. As another possibility, generating perception inference 408 could include generating the perception inference via a layer of neural network 400, which in turn could include the layer generating the perception inference. For example, as shown in FIG. 6a, generating perception inference 408 may include network layer 402c generating the perception inference. As a further possibility, generating the perception inference may include generating the perception inference via a layer based on a parameter. For example, as shown in FIG. 6a, generating perception inference 408 may include generating the perception inference via layer 402c based on parameter 404c. Generating the perception inference may include generating the perception inference based on multiple parameters and/or via multiple layers, based on a single parameter and/or via a single layer, or any combination of these (or none of these).

Generating perception inference 408 based on an augmented feature map may include generating the perception inference based on another augmented feature map. For example, generating the perception inference based on the augmented feature map may include generating the perception inference based on a first augmented feature map including a first generated feature map augmented with features of a complementary feature map, where the first generated feature map in turn was generated based on a second augmented feature map. In the embodiment illustrated in FIG. 6a, generating perception inference 408 based on an augmented feature map involves generating the perception inference based on augmented feature map 413, which includes generated feature map 413a augmented with features of complementary feature map 413b. Feature map 413a in turn is generated based on augmented feature map 412. Generating a perception inference via neural network 400 may involve respective branches of the neural network generating respective perception inferences. For example, as shown in FIG. 6b, generating perception inference 408 via neural network 400 may include branch 400a of neural network 400 generating the perception inference. Additionally, generated feature map 416a may be augmented with features of complementary feature map 416b, which could take the form of feature map 411a generated by branch 400a or another feature map based on feature map 411a. A perception inference 409 may be generated by branch 400b based on augmented feature map 416. As another example, in FIG. 6c, generated feature map 415a is augmented with features of complementary feature map 415b, which could take the form of feature map 413a generated by branch 400a or another feature map based on feature map 413a. Perception inference 409 is generated by branch 400b based on augmented feature map 415. As with perception inference 408, perception inference 409 may be generated via one or more layers, based on one or more parameters, or any combination of these (or none of these).

Figure 7:
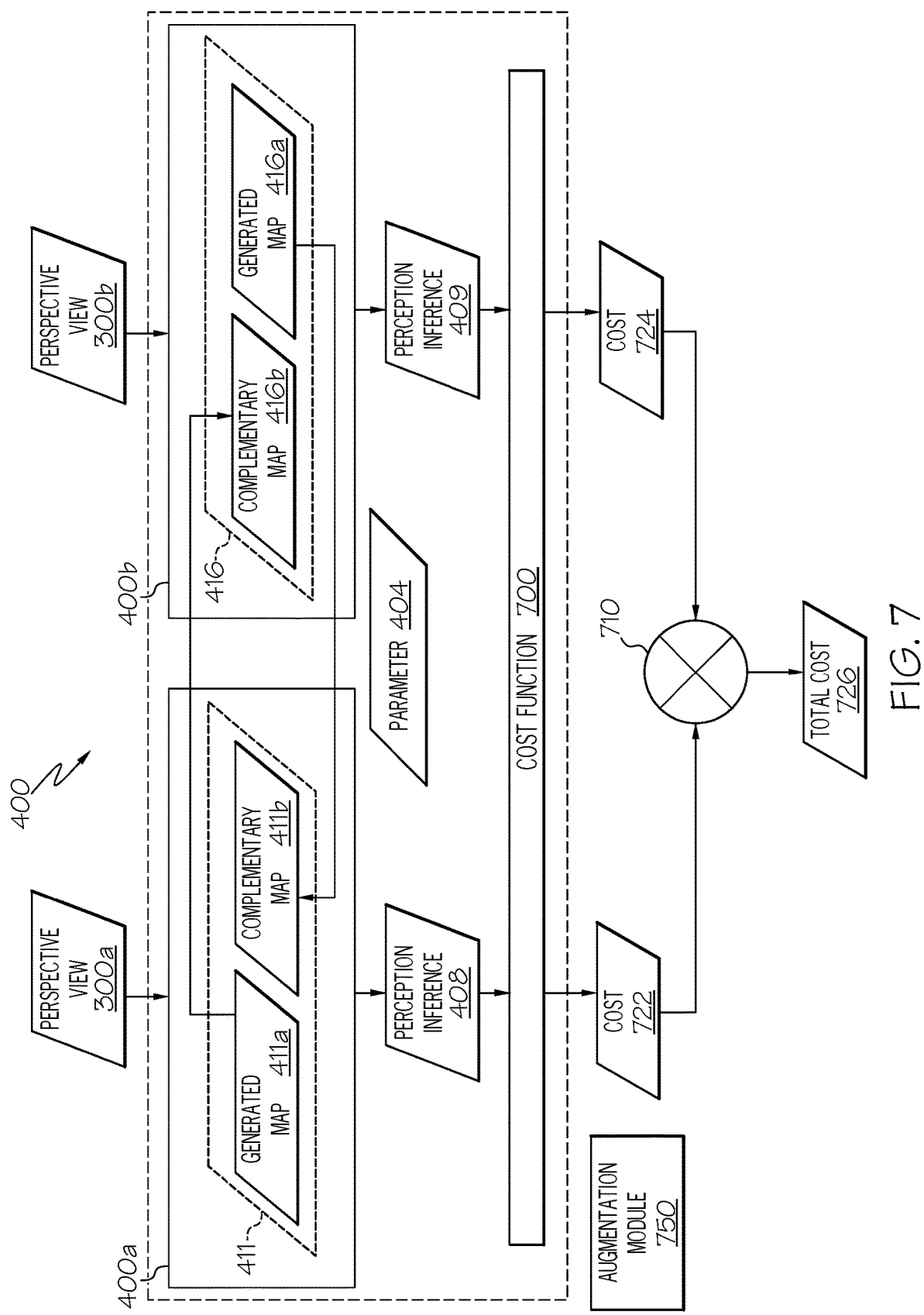
FIG. 7 depicts an operation of a perception neural network having a parameter and a cost function, according to one or more embodiments described and illustrated herein.

FIG. 7 depicts an operation of a perception neural network having a parameter and a cost function, according to one or more embodiments described and illustrated herein. As shown, neural network 400 includes a parameter 404, which could take the form of (or include) parameter 404a, 404b, or 404c illustrated in FIG. 6a, or any combination of these or other parameters. Additionally, neural network 400 includes a cost function 700, which calculates a cost associated with a generated perception inference.

In an embodiment, a perception-network device (such as training device 102 or another network-perception device) generates feature map 411a, via branch 400a, based on perspective view 300a provided to the branch and further based on parameter 404. Complementary feature map 411b takes the form of, includes, or is based on feature map 416a generated by branch 400b based on both perspective view 300b provided to the branch and the parameter. Branch 400b may be executed by the same device executing branch 400a, or may be executed by a different device.

Perception-network device 200 may calculate, via cost function 700, a cost 722 associated with perception inference 408 generated as described above. Perception-network device 200 calculating a cost via cost function 700 of neural network 400 may include neural network 400 calculating the cost via cost function 700, which in turn may include cost function 700 calculating the cost.

Additionally, perception-network device 200 obtains a cost 724 calculated via cost function 700. Cost 724 is associated with perception inference 409 generated by branch 400b based on augmented feature map 416, which includes complementary feature map 416b generated by branch 400b augmented with features of feature map 411a generated by branch 400a, for example.

Perception-network device 200 updates parameter 404 based on a total cost 726 that comprises a sum of cost 722 and cost 724, generated perhaps by a summation module 710 configured to generate a sum of two or more costs provided to the summation module. The summation module could be a module of neural network 400, perception-network device 200, any other perception-network device, or any combination of these, as examples. Additionally, the summation module could take the form of an ECU, instructions executable by processor 202, or a combination of these, as examples.

Perception-network device 200 may subsequently provide a third perspective view of a scene to branch 400a, and branch 400b may be provided with a fourth perspective view of the same scene. Perception-network device 200 may then repeat the process described above based on the updated parameter, and calculate a third cost and obtain a fourth cost in the manner described above. The perception-network device may again update the parameter based on a sum of the calculated and obtained costs, and repeat the process any number of times (e.g., so as to train the neural network and/or the cost function of the neural network). In an embodiment, the total cost decreases over a plurality of iterations, and converges toward a total cost after a plurality of iterations.

In an embodiment (with reference to FIG. 4), augmenting generated feature map 411a with features of complementary feature map 411b includes initially augmenting generated feature map 411a with empty feature units and subsequently replacing one of more of the empty feature units with one or more features of complementary feature map 411b. Perception-network device 200 may initially augment feature map 411a with empty feature units to, for example, train neural network 400 to generate a perception inference when perception-network device 200 is unable to augment feature map 411a with a complementary feature map. For instance, vehicle 104 executing branch 400a may be unable to augment feature map 411a if perspective view 300a provided to branch 400a and perspective view 300b provided to branch 400b are perspective view of respectively different scenes, or if vehicle 106 executing branch 400b is not in proximity to vehicle 104 and is unable to send a complementary feature map to vehicle 104 via a wireless communication link, among other possibilities. In such cases, vehicle 104 may augment feature map 411a with empty feature units, and neural network 400 deployed to vehicle 104 may be trained such that vehicle 104 is able to generate a perception inference based on a feature map augmented with empty feature units, perhaps more accurately than if the neural network were not trained to generate a perception inference based on a feature map augmented with empty feature units. The empty feature units could take the form of respective zero values, for example.

In cases where, for instance, vehicle 106 is in proximity to vehicle 104 and perspective views 300a and 300b are perspective views of the same scene, then vehicle 104 may replace the empty feature units with features of complementary feature map 411b. In an embodiment, perception-network device 200 augments feature map 411a with empty feature units. The perception-network device makes a determination that perspective view 300a and perspective view 300b are respectively different views of a given scene, and in response to making the determination, replaces the empty feature units with one or more features of complementary feature map 411b.

Figure 8:
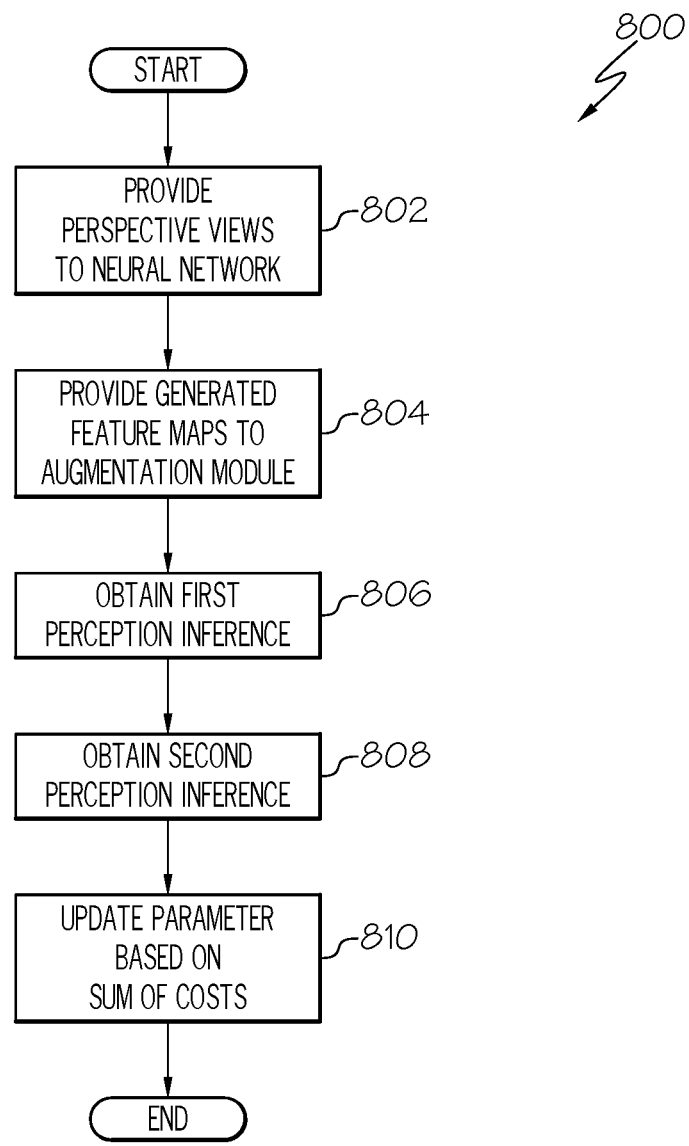
FIG. 8 depicts a flowchart of a method carried out by a perception-network system, according to one or more embodiments described and illustrated herein.

FIG. 8 depicts a flowchart of a method carried out by system 100, according to one or more embodiments described and illustrated herein. As shown, a method 800 begins at step 802 with training device 102 (or another perception-network device) providing, to neural network 400, both perspective view 300a of a scene and perspective view 300b of the scene. Providing the perspective views could include obtaining the perspective views from a database or other data source, and could include providing the obtained perspective views to the neural network, as examples.

At step 804, training device 102 provides, to an augmentation module 750 (as shown in FIG. 7), both feature map 411a generated by neural network 400 based on perspective 300a and feature map 416a generated by the neural network based on perspective view 300b. The augmentation module could be a module of neural network 400, training device 102, any other perception-network device, or any combination of these, as examples, and could take the form of an ECU, instructions executable by a processor, or both, as examples. The augmentation module may be generally configured to output a complementary feature map in the form of (or that includes) either a map provided to the augmentation module or an empty feature map (e.g., if no map is provided to the augmentation module).

At step 806, training device 102 obtains perception inference 408 generated based on map 411a, complementary feature map 411b, and parameter 404. Complementary feature map 411b is output by augmentation module 750, and includes feature map 416a provided to the augmentation module.

At step 808, training device 102 obtains perception inference 409 generated based on feature map 416a, complementary feature map 416b, and parameter 404. Complementary feature map 416b is output by augmentation module 750, and includes feature map 411a provided to the augmentation module.

At step 810, training device 102 updates parameter 404 based on a sum of cost 722 and cost 724—for example, based on total cost 726 that includes a sum of cost 722 and cost 724. Cost 722 is associated with perception inference 408, and cost 724 is associated with perception inference 409. Cost 722 could be calculated based on, for example, a difference between perception inference 408 and a ground truth associated with perspective view 300a. Similarly, cost 724 could be calculated based on a difference between perception inference 409 and a ground truth associated with perspective view 300b.

After training by training device 102, neural network 400 may be deployed to vehicles 104 and 106. When the vehicles are in proximity, they may detect the presence of each other, and may determine whether the respective sensor of each vehicle has an overlapping field of view of a given scene. If it is determined that they do, then the vehicles may begin to exchange complementary feature maps, and generate respective perception inferences.

Each vehicle may execute a respective branch of neural network 400. From the standpoint of a respective vehicle, that vehicle will perform method 500 using branch 400a, and any other vehicles in proximity to that vehicle will perform the method using branch 400b. For example, vehicles 104 and 106 may be in proximity to each other and may be exchanging complementary feature maps. From the standpoint of vehicle 104 executing method 500, vehicle 104 executes branch 400a and vehicle 106 executes branch 400b: branch 400a executing on vehicle 104 generates a first feature map via branch 400a, and a second (complementary) feature map is generated by branch 400b executing on vehicle 106.

In an embodiment, vehicles 104 and 106 are provided with neural network 400, updated parameter 404, and (in some embodiments) augmentation module 750. For example, steps 802 through 810 may be carried out one or more times by training device 102 (e.g., with different perspectives views to train the neural network). The updated parameter, the neural network (e.g., any parameters used by neural network 400 and instructions for causing vehicle 104 to execute the neural network), and augmentation module (e.g., instruction for causing vehicle 104 to execute the augmentation module) may then be deployed to vehicles 104 and 106.

Vehicle 104 may then execute an instance of the neural network deployed to the vehicle. For example, in an embodiment, branch 400a is executed by vehicle 104, branch 400b is executed by vehicle 106, and method 500 is carried out by vehicle 104. Both vehicles include a respective sensor 258 (e.g., a camera), and neural network 400 and parameter 404 (e.g., as updated by training device 102) are deployed to both vehicles. Vehicle 104 may generate (e.g., via branch 400a) feature map 411a and/or perception inference 408 based on parameter 404 (perhaps as updated in the manner described above). Complementary feature map 411b and/or a perception inference (such as perception inference 409 illustrated in FIG. 6c) may be generated by vehicle 106 (e.g., via branch 400b) based on the same parameter 404, Vehicle 104 may obtain complementary feature map 411b from vehicle 106 over wireless communication link 114 via wireless communication interface 256 of vehicle 104—for example, when vehicles 104 and 106 are in proximity to each other.

In an embodiment, vehicle 104 obtains perspective view 300a via sensor 258 of the vehicle at time t1. Additionally, complementary feature map 411b is generated based on perceptive view 300b captured obtained via sensor 258 of vehicle 106 at time t2. Vehicle 104 determines that a difference between t1 and t2 is less than a threshold difference. In such an embodiment, augmenting feature map 411a at step 506 may include vehicle 104 augmenting the feature map in response to determining that the difference between t1 and t2 is less than the threshold difference, or may include augmenting the feature map only if the difference between t1 and t2 is less than the threshold difference. For instance, vehicle 104 may obtain a message from vehicle 106 over wireless communication link 114, and the message may include complementary feature map 411b as well as an indication of t2 and possibly an indication of a current time of vehicle 106. Vehicle 104 may determine the difference based on t2 indicated by the message—for example, if respective clocks of vehicles 104 and 106 generating t1 and t2 are synchronized to within a threshold difference.

By so augmenting the feature map, vehicle 104 may be able to determine or estimate that perspective views 300a and 300b represent perspective views of the same scene. To illustrate, a first perspective view of a given scene and a second perspective view of a given scene obtained by vehicles 104 and 106 at times t1 and t2 (respectively) may be perspective views of the same scene. However, even seconds later, the scene of a first perspective view obtained by vehicle 104 at time t3 may be different from the scene of a second perspective view obtained by vehicle 106 at time t4. This may occur if, for example, vehicle 104 has changed position between t0 and t2, and/or if vehicle 106 has changed position between t1 and t3. By determining a difference between the times at which the first and perspective views are obtained, vehicle 104 may be able to determine that the second perspective view was obtained at approximately the same time as the first perspective view.

In another embodiment, vehicle 104 generates feature map 411a at time t1 and complementary feature map 411b is generated at time t2. In such an embodiment, augmenting feature map 411a at step 506 may include vehicle 104 augmenting the feature map in response to determining that the difference between t1 and t2 is less than the threshold difference, or may include augmenting the feature map only if the difference between t1 and t2 is less than the threshold difference.

In an embodiment, perspective view 300a is a perspective view of a first scene obtained via sensor 258 of vehicle 104, and perspective view 300b is a perspective view of a second scene obtained via sensor 258 of vehicle 106. In such an embodiment, augmenting feature map 411a at step 506 may include vehicle 104 augmenting the feature map in response to determining that an overlap between the first scene and the second scene is greater than a threshold overlap, or augmenting the feature map only if the overlap between the first scene and the second scene is greater than the threshold overlap. For instance, vehicle 104 may obtain complementary feature map 411b from vehicle 106 over wireless communication link 114, and may further obtain an indication of a field of view of sensor 258 of vehicle 106, a location of the sensor, a location of vehicle 106, and/or another indication or identification of perspective view 300b over wireless communication link 114, as examples. Vehicle 104 may determine the overlap based on the obtained indication.

Figure 9:
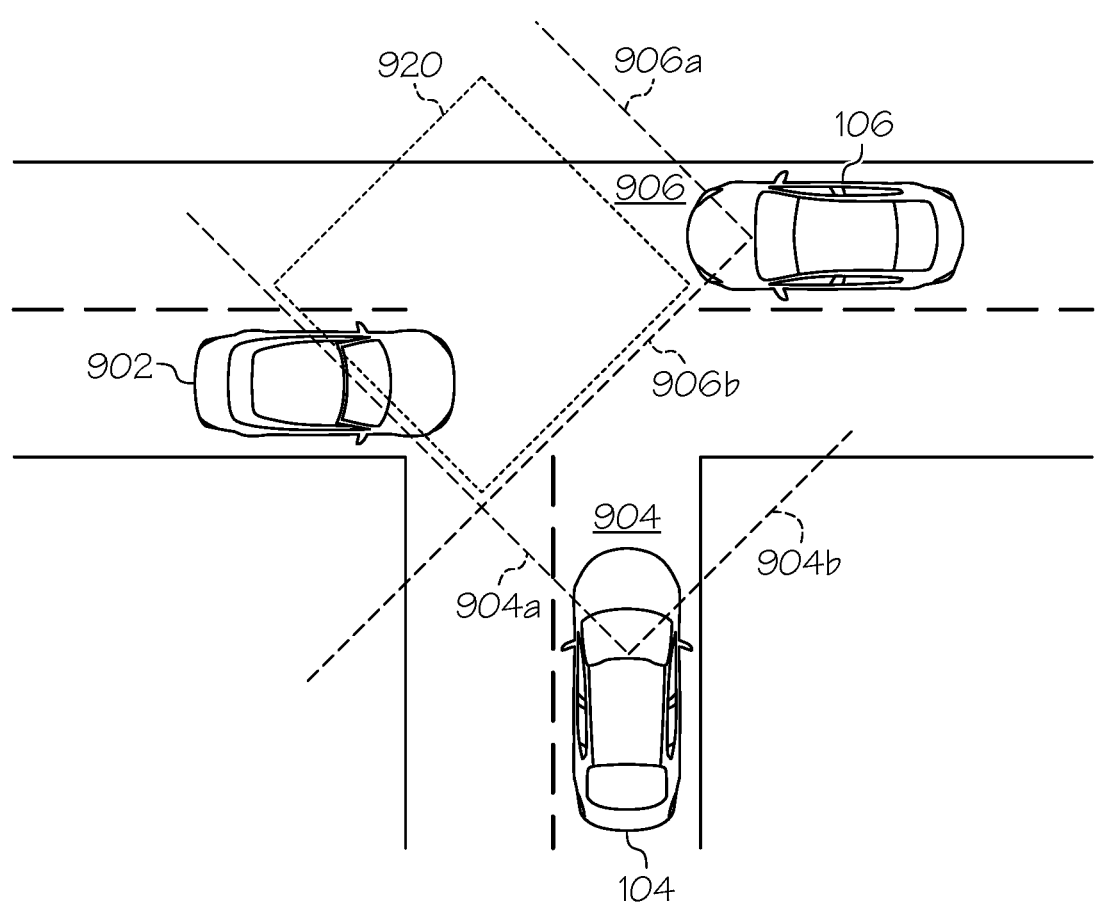
FIG. 9 depicts an example scenario in which two vehicles obtain respective perspective views of a scene, according to one or more embodiments described and illustrated herein.

FIG. 9 depicts an example scenario in which two vehicles obtain respective perspective views of a scene, according to one or more embodiments described and illustrated herein. As shown, vehicles 104 and 106 are approaching an intersection, and a road agent 902 (in this example, another vehicle) is proceeding through the intersection. Vehicle 104 obtains a perspective view 904 of a scene, and vehicle 106 obtains a perspective view 906 of a scene. In the illustrated embodiment, perspective view 904 includes a field of view between left boundary 904a and right boundary 904b, and perspective view 906 includes a field of view between right boundary 906a and left boundary 906b. An overlap 920 represents an overlap between perspective view 904 and perspective view 906.

In an embodiment, vehicle 104 is provided with neural network 400, the updated parameter of step 810 above, and augmentation module 750. The vehicle obtains perspective view 904 from a sensor of the vehicle, and obtains a first perception inference generated by neural network 400 based on a first feature map generated by the neural network, a first complementary feature map output by augmentation module 750, and the updated parameter of step 810 above. The first feature map and the first perception inference are generated by an instance of neural network 400 executed by the vehicle.

In an embodiment, vehicle 104 receives, from vehicle 106 via wireless communication interface 256 of vehicle 104, a second feature map generated by neural network 400 based on perspective view 906 obtained by sensor 258 of vehicle 106, and provides the received second feature map to augmentation module 750. The first complementary feature map output by augmentation module 750 above takes the form of (or includes) the second feature map provided to the augmentation module. In such an embodiment, the first feature map is generated based on perspective view 904 and the updated parameter of step 810 above, and the second feature map is generated based on perspective view 906 and the updated parameter.

It should now be understood that one or more embodiments described herein are directed to perception-network systems, perception-network devices, and methods for generating a perception inference. In some embodiments, a perception-network device provides a first perspective view of a scene to a first branch of a neural network, and generates a feature map via the first branch based on the first perspective view. The perception-network device augments the generated feature map with features of a complementary feature map generated by a second branch of the neural network provided with a second perspective view of the scene. The perception-network device generates a perception inference via the first branch based on the augmented feature map.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
providing a first perspective view of a scene from a first point of view to a first branch of a neural network;
generating a feature map via the first branch based on the first perspective view;
augmenting the generated feature map with features of a complementary feature map generated by a second branch of the neural network provided with a second perspective view of the scene from a second point of view, different than the first point of view; and
generating a perception inference via the first branch based on the augmented feature map.

2. The method of claim 1, wherein:
generating the feature map based on the first perspective view comprises generating the feature map based on the first perspective view and a parameter of the neural network, and
the complementary feature map generated by the second branch provided with the second perspective view comprises a complementary feature map generated by the second branch based on the second perspective view and the parameter.

3. The method of claim 2, wherein:
generating the feature map via the neural network comprises generating the feature map via a layer of the neural network, and
the complementary feature map generated by the second branch comprises a complementary feature map generated by the layer.

4. The method of claim 3, wherein:
generating the feature map via the layer comprises generating the feature map via the layer based on the first perspective view and a parameter of the layer, and
the complementary feature map generated by the layer comprises a complementary feature map generated by the layer based on the parameter.

5. The method of claim 3, wherein the layer comprises a first layer and a second layer, the method further comprising:
generating a first-layer feature map via the first layer of the first branch of the neural network based on the first perspective view; and
augmenting the generated first-layer feature map with features of a complementary first-layer feature map generated by the first layer of the second branch of the neural network provided with the second perspective view,
wherein:
generating the feature map via the layer comprises generating a second-layer feature map via the second layer based on the augmented first-layer feature map,
the complementary feature map generated by the layer comprises a complementary second-layer feature map generated by the second layer based on a second-branch map generated by the first layer of the second branch provided with the second perspective view and augmented with features of the generated first-layer feature map,
augmenting the generated feature map with features of the complementary feature map comprises augmenting the generated second-layer feature map with features of the complementary second-layer feature map, and
generating the perception inference based on the augmented feature map comprises generating the perception inference based on the augmented second-layer feature map.

6. The method of claim 2, further comprising:
calculating, via a cost function of the neural network, a first cost that is associated with the perception inference generated via the first branch;
obtaining a second cost, calculated via the cost function, that is associated with a perception inference generated, via the second branch, based on a second-branch augmented feature map, wherein the second-branch augmented feature map comprises the complementary feature map generated by the second branch augmented with features of the feature map generated via the first branch; and
updating the parameter of the neural network based on a sum of the first cost and the second cost.

7. The method of claim 1, carried out by a first perception-network device, wherein:
both the first branch and second branch are executed by the first perception-network device, and
augmenting the generated feature map with features of the complementary feature map comprises augmenting the generated feature map with features of the complementary feature map obtained from the second branch via at least one of a shared memory of the first perception-network device, a system bus of the first perception-network device, and inter process communication between the first branch and the second branch.

8. The method of claim 1, carried out by a first perception-network device, wherein:
the first branch is executed by the first perception-network device and the second branch is executed by a second perception-network device different from the first perception-network device, and
the first perception-network device comprises a first sensor and the second perception-network device comprises a second sensor.

9. The method of claim 8, wherein:
obtaining the first perspective view comprises obtaining the first perspective view via the first sensor at a first-perspective time,
the complementary feature map generated based on the second perspective view comprises a complementary feature map generated based on a second perspective view obtained via the second sensor at a second-perspective time,
augmenting the feature map comprises augmenting the feature map in response to determining that a difference between the first-perspective time and the second-perspective time is less than a threshold difference.

10. The method of claim 8, wherein:
obtaining the first perspective view comprises obtaining a first perspective view of a first scene via the first sensor,
the complementary feature map generated based on the second perspective view comprises a complementary feature map generated based on a second perspective view of a second scene obtained via the second sensor, and
augmenting the feature map comprises augmenting the feature map in response to determining that an overlap between the first scene and the second scene is greater than a threshold overlap.

11. The method of claim 1, wherein augmenting the generated feature map with features of the complementary feature map comprises:
augmenting the generated feature map with empty feature units;
making a determination that the first perspective view and the second perspective view comprise respectively different perspective views of a given scene; and
in response to making the determination, replacing one or more of the empty feature units with one or more of the features of the complementary feature map.

12. A perception-network system including a first perception-network device having a processor and a non-transitory computer-readable storage medium comprising first-device instructions that, when executed by the processor, cause the first perception-network device to:
provide a first perspective view of a scene from a first point of view to a first branch of a neural network executed by the first perception-network device;
generate a feature map via the first branch based on the first perspective view;
augment the generated feature map with features of a complementary feature map generated by a second branch of the neural network provided with a second perspective view of the scene from a second point of view, different than the first point of view; and
generate a perception inference via the first branch based on the augmented feature map.

13. The perception-network system of claim 12, wherein:
both the first branch and second branch are executed by the first perception-network device, and
augmenting the generated feature map with features of the complementary feature map comprises augmenting the generated feature map with features of the complementary feature map obtained from the second branch via at least one of a shared memory of the first perception-network device, a system bus of the first perception-network device, and inter process communication between the first branch and the second branch.

14. The perception-network system of claim 12,
further comprising a second perception-network device having a second-device sensor, a processor, and a non-transitory computer-readable storage medium comprising second-device instructions that, when executed by the processor, cause the second perception-network device to execute the second branch of the neural network,
wherein the first perception-network device further comprises a first-device sensor.

15. The perception-network system of claim 12, wherein:
the first-device instructions further cause the first perception-network device to:
generate a first-layer feature map via a first layer of the first branch of the neural network based on the first perspective view; and
augment the generated first-layer feature map with features of a complementary first-layer feature map generated by the first layer of the second branch of the neural network provided with the second perspective view,
the first-device instructions to generate the feature map comprise first-device instructions that cause the first perception-network device to generate a second-layer feature map via a second layer based on the augmented first-layer feature map,
the complementary feature map generated by the layer comprises a complementary second-layer feature map generated by the second layer based on a second-branch map generated by the first layer of the second branch provided with the second perspective view and augmented with features of the generated first-layer feature,
the first-device instructions to augment the generated feature map with features of the complementary feature map comprise first-device instructions that cause the first perception-network device to augment the generated second-layer feature map with features of the complementary second-layer feature map, and
the first-device instructions to generate the perception inference based on the augmented feature map comprise first-device instructions that cause the first perception-network device to generate the perception inference based on the augmented second-layer feature map.

16. A method comprising:
providing, to a neural network, both a first perspective view of a scene and a second perspective view of the scene;
providing, to an augmentation module, both a first feature map generated by the neural network based on the first perspective view and a second feature map generated by the neural network based on the second perspective view, wherein the augmentation module is configured to output a complementary feature map comprising either a map provided to the augmentation module or an empty feature map;
obtaining a first perception inference generated by neural network based on the first feature map, a first complementary feature map output by the augmentation module, and a parameter of the neural network, wherein the first complementary feature map comprises the second feature map provided to the augmentation module;

obtaining a second perception inference generated by the neural network based on the second feature map, a second augmented map output by the augmentation module, and the parameter of the neural network, wherein the second complementary feature map comprises the first feature map provided to the augmentation module; and updating the parameter of the neural network based on a sum of a first cost and a second cost, wherein the first cost is based on the first perception inference and the second cost is based on the second perception inference.

17. The method of claim 16, wherein:

the first cost based on the first output of the neural network comprises a cost calculated based on a difference between the first perception inference and a ground truth associated with the first perspective view, and the second cost based on the second output of the neural network comprises a cost calculated based on a difference between the second perception inference and a ground truth associated with the second perspective view.

18. The method of claim 16, further comprising:

a first vehicle obtaining a first second-scene perspective view of a second scene from a first sensor of the first vehicle; and the first vehicle obtaining a third perception inference generated by the neural network based on a third feature map generated by the neural network, a third complementary feature map output by the augmentation module, and the updated parameter, wherein:
the third feature map is based on the first second-scene perspective view, and the third feature map and the third perception inference are generated by an instance of the neural network executed by the first vehicle provided with the neural network, the updated parameter, and the augmentation module.

19. The method of claim 18, further comprising:

the first vehicle receiving, from a second vehicle via a wireless communication interface of the first vehicle, a fourth feature map generated by the neural network based on a second second-scene perspective view obtained by a second sensor of the second vehicle; and providing the fourth feature map to the augmentation module, wherein the third complementary feature map comprises the fourth feature map provided to the augmentation module.

20. The method of claim 19, wherein:

the third feature map is generated based on the first second-scene perspective view and the updated parameter of the network, and the fourth feature map generated based on the second second-scene perspective view and the updated parameter of the network.

* * * * *

UNITED STATES PATENT AND TRADEMARK OFFICE
CERTIFICATE OF CORRECTION

PATENT NO. : 11,182,652 B2
APPLICATION NO. : 16/542715
DATED : November 23, 2021
INVENTOR(S) : Rui Guo, Hongsheng Lu and Prashant Tiwari Page 1 of 1

It is certified that error appears in the above-identified patent and that said Letters Patent is hereby corrected as shown below:

In the Specification

In Column 8, Line(s) 3, delete "401c" and insert --402c--, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*